United States Patent [19]

Jouade

[11] Patent Number: 5,013,012

[45] Date of Patent: May 7, 1991

[54] HYDRAULIC ANTI-VIBRATORY SUPPORT SLEEVES

[75] Inventor: Pierre Jouade, Chateaudun, France

[73] Assignee: Hutchinson, Paris, France

[21] Appl. No.: 53,751

[22] Filed: May 26, 1987

[30] Foreign Application Priority Data

Jun. 3, 1986 [FR] France .................. 86 07974

[51] Int. Cl.$^5$ .................................... F16M 15/04
[52] U.S. Cl. ................. 267/140.1; 180/312; 248/562; 248/636
[58] Field of Search ............ 267/140.1, 141.2, 219, 267/293; 248/562, 634, 636; 180/300, 902, 312

[56] References Cited

U.S. PATENT DOCUMENTS

| | | | |
|---|---|---|---|
| 4,057,236 | 11/1977 | Hennells | 188/315 X |
| 4,690,389 | 9/1987 | West | 267/140.1 |
| 4,700,934 | 10/1987 | Andra et al. | 267/140.1 |

FOREIGN PATENT DOCUMENTS

| | | | |
|---|---|---|---|
| 139507 | 7/1985 | Japan | 248/562 |
| 168931 | 9/1985 | Japan | 267/140.1 |
| 9318 | 1/1986 | Japan | 267/140.1 |

*Primary Examiner*—George E. A. Halvosa
*Attorney, Agent, or Firm*—Larson & Taylor

[57] ABSTRACT

A hydraulic anti-vibratory support sleeve is provided having two rigid tubular frames surrounding each other mutually and joined together by an elastomer body adhering thereto and shaped so as to form at least two sealed pockets full of liquid and communicating together through a narrow channel, said body having the general form of an X in axial section. The channel extends along a transverse arc of a circle situated axially and radially at the level of the ends of the arms of the X.

12 Claims, 2 Drawing Sheets

HYDRAULIC ANTI-VIBRATORY SUPPORT SLEEVES

BACKGROUND OF THE INVENTION

1. Field of the Invention

The invention relates to hydraulic anti-vibratory support sleeves including two rigid tubular frames, one surrounding the other, preferably of revolution at least partially, coaxial and concentric at least under load, which frames are joined together by a elastomer body adhering thereto and shaped so as to form therewith at least two diametrically opposite sealed pockets communicating therebetween through a narrow channel, the assembly of said pockets and said channel being filled with a shock absorbing liquid.

Such sleeves are intended to be mounted between two rigid pieces fixable respectively to the two frames and adapted to undergo, with respect to each other, oscillation oriented in a diametrical direciton D with respect to the axis common to the two frames, the assembly being arranged so that, for some at least of these oscillations, the liquid is driven alternately from one of the pockets towards the other and conversely through the narrow channel, which creates in this liquid, for certain oscillation frequencies, a resonance phenomenon capable of damping the transmission of these oscillation from one of the frames to the other.

The sleeves of the kind in question are for example intended to be inserted between a vehicle chassis and the internal combustion engine or the front or rear undercarriage.

2. Description of the Prior Art

The invention relates more particulary, among the above support sleeves, to those in which the portion of the elastomer body which defines one at least of the pockets has in axial section the general shape of a radially outwardly open V, such as described in patent U.S. Pat. No 3,698,703: these sleeves lend themselves to relatively large resilient deformations representing relatively high mutual tilting of the axes of the two frames.

In presently known embodiments of these sleeves, the narrow channel which connects the two pockets together is generally formed by a channel in the form of an arc of a circle extending in the median transverse plane of the sleeve, along the internal frame or, more rarely, along the external frame.

These embodiments have the following drawback: the narrow channel is relatively far removed from the endmost axial faces of the sleeve, which raises problems for filling this sleeve with liquid and for providing sealing, such filling having to be carried out before the external frame is positioned about the elastomer body.

Furthermore, it is not possible to modify the dimensions of the narrow channel, and so the damping characteristics fo the sleeve, after manufacture thereof.

The aim of the invention is, especially, to overcome these drawbacks.

SUMMARY OF THE INVENTION

For this, in the support sleeves of the kind in question in accordance with the inventin, the channel extends in a way known per se along a transverse arc of a circle having as axis the axis of the external tubular frame and this arc is situated axially and radially at the level of the end of one of the arms of the above V.

In advantageous embodiments, recourse is further had to one and/or the other of the following arrangements:

the channel is defined by a metal shroud having a U section opening outwardly of the sleeve in the direction of the axis of this sleeve and disposed inside the external tubular frame, in the vicinity thereof, and by a rigid annular packing introduced axially into this shroud, in a sleeve according to the previous paragraph, the bottom of the shroud communicates with at least one of the pockets through a circumferentially elongate aperture and the length of the channel may be adjusted by modifying the angular position of the annular packing in the shroud, communication is provided between the channel and the outside for filling the sleeve with liquid, the sleeve has two channels disposed respectively in the vicinity of its two axial ends, symmetrically with respect to its transverse median plane, in a sleeve according to the preceding paragraph, one of the two channels is provided with a resiliently compressible cushion formed more particularly of a cellular material with closed cells and placed in communication with at least one of the two packets, the outwardly divergent walls forming the elastomer body are adhered to two truncated cone shaped faces which define a central annular V shaped rib forming part of the internal frame, each of these two truncated cone shaped faces being substantially normal to the generatrices of the truncated cone shaped wall adhering thereto, a dividing wall extending along the transverse median plane of the sleeve extends the internal frame radially outwardly as far as a short distance from the external frame so as to divide the corresponding pocket into two compartments communicating together through the channel defined radially between this wall and said external frame, a rigid cylindrical ring is fixed along the inner face of the external frame, between two pads which define the elastomer body outwardly, the elastomer body is prestressed axially during fitting thereof inside the external frame, the number of sealed pockets is equal to four, diametrically opposite in pairs, and each of these pockets communicates with the diametrically opposite pocket through a channel, one of the pockets is defined by the external tubular frame and by a flexible membrane sealingly fixed to this frame.

The invention includes, apart from these main arrangements, certain other arrangements which are preferably used at the same time and which will be more explicitly discussed hereafter.

BRIEF DESCRIPTION OF THE DRAWINGS

In what follows, several preferred embodiments of the invention will be described with reference to the accompanying drawings in a way which is of course in no wise limitative.

DESCRIPTION OF THE PREFERRED EMBODIMENTS

Figure 1:
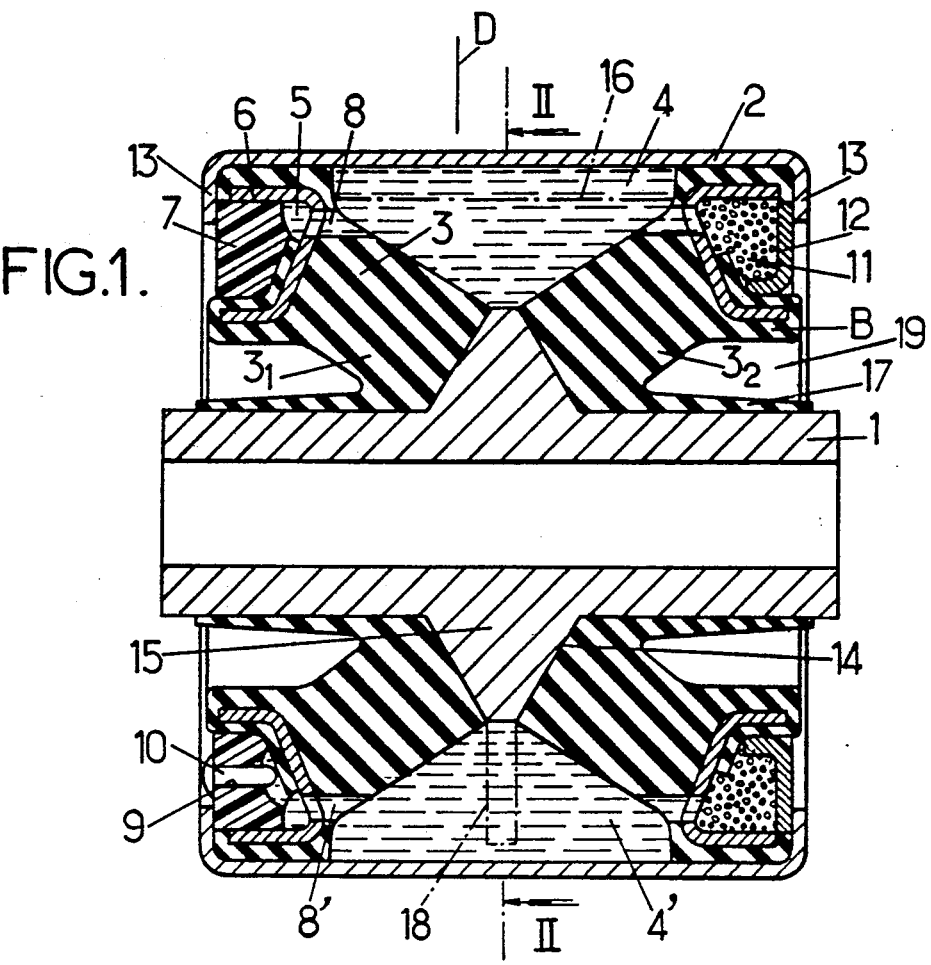
FIGS. 1 and 2 of these drawings show a hydraulic anti-vibratory sleeve constructed in accordance with the invention, respectively in axial section through I—I of FIG. 2 and in cross section on a smaller scale through II—II of FIG. 1.
Figure 2:
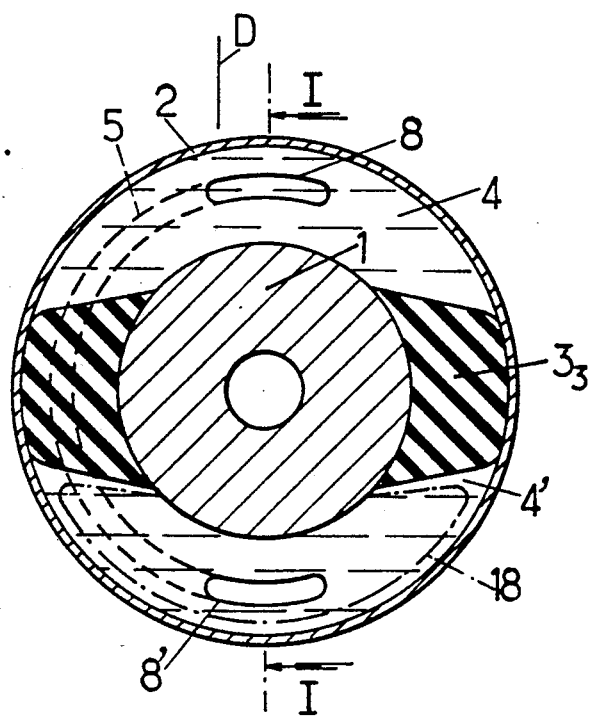

In a way known per se, the sleeve illustrated in FIGS. 1 and 2 includes:

an internal metal tubular frame of revolution 1, an external metal tubular frame of revolution 2, coaxial with frame 1 at least in the mounted and loaded condition of the sleeve and surrounding this frame 1, and an elastomer body 3 connecting the two frames 1 and 2 together while forming therebetween two sealed pockets 4, 4' which are disposed diametrically opposite in the direction D.

The internal frame 1 is intended to be fixed to a pin (not shown) which passes jointingly therethrough whereas the external frame 2 is intended to be fixed to a bearing (not shown), this pin and this bearing being fixed respectively to two rigid elements between which it is desired to mount an inti-vibratory support, elements such as a vehicle engine and the chassis of the vehicle.

The two pockets 4 and 4' communicate together through a narrow channel 5. These two pockets and the narrow channel are filled with a liquid L.

In the embodiment shown in FIGS. 1 and 2, the essential portion of body 3 has, under load, a form of revolution with an axial section in the form of an X: two grooves 19 opening axially outwardly of the sleeve are then disposed between the inner tubular frame 1 and the thick walls $3_1$, $3_2$ of a general conical shape corresponding to this X.

Two diametrically opposite radial arms $3_3$ complete these walls $3_1$, $3_2$ so as to form body 3 therewith.

When an oscillation of a relatively low frequency (for example of the order of 10 to 50Hz) and of a relatively large amplitude (greater than 1mm) is imposed in the diametrical direction D on one of the frames 1, 2 with respect to the other, liquid L is driven alternately at said frequency through channel 5 from one of the pockets 4, 4' to the other and conversely and the dimensions of said channel, in particular its length and it section, are determined so that excellent damping of said oscillation is obtained for a given value of said frequency by the creation of a resonance effect in the liquid column then present in the channel.

This channel extends, again in a way known per se, along an arc of a circle havng an axis that of the sleeve, but it is here located, not in the median transverse zone of this sleeve, but in the vicinity of one of the axial ends of the elastomer material body 3 and in the vicinity of the external tubular frame 2, that is to say axially and radially at the level of the ends of the arms of the above defined X.

In the embodiment shown in FIG. 1 and 2, the external contour of body 3 is defined axially and radially by two annular "sausages" and it is in at least one of these sausages that channel 5 is housed.

The channel could, at least particaly, be directly formed in the sausage concerned.

In the embodiment considered, a metal shroud 6 having a U shaped profile opening axially outward of the sleeve is disposed in each sausage and one at least of the two shrouds 6 is closed by an annular packing 7 formed more particularly by a rigid plastic material.

The profile of packing 7 is such that it is force fitted into shroud 6 and, once fitted, channel 5 is formed between the packing and the shroud.

The bottom of shroud 6 as well as the elastomer mass which covers this bottom are formed with two apertures 8, 8' causing channel 5 to communicate with respectively the two pockets 4 and 4'.

In an interesting embodiment, the section of each aperture 8, 8' is elongated circumferentially, as can be seen in FIG. 2.

The length of channel 5 may then be adjusted by simply modifiying the angular positon of packing 7 in shroud 6, the shape of this packing being provided accordingly.

Channel 5, disposed in a lateral sausage of body 3, may be the only one and then extend over an arc generally between 90° and 270°, for example of the order of 180°.

It may also be double, being in this case formed more particularly of two semicircular sections symmetrical with each other with respect to an axial plane passing through the middles of the two apertures 8 and 8'.

Such a single or double channel 5 may be provided in each of the two lateral sausages of body 3.

Because channel 5 is adjacent an axial end of the sleeve, it may be readily placed in communication with the outside of this sleeve throght a very short duct 9 formed in the packing 7.

This duct may be used for filling the sleeve with liquid L.

Said duct may be a single one, and in this case filling of the sleeve with liquid may involve a previous phase of evacuating the volume to be filled; but it may also be divided into two ducts of the same kind sufficiently distant from each other to facilitate removal of the air inside the sleeve during filling.

At 10 is shown a plug closing the duct 9 at the end of filling.

To make the sleeve capable of damping not only oscillation of a relatively low frequency and a relatively large amplitude, but also certain vibrations of higher frequency and smaller amplitude, in one of the two above described shrouds 6 there is advantageously provided a compressible resilient cushion placed in permanent communication with one at least of the two pockets through apertures of the same kind as those designated above by the references 8 and 8'.

Such a cushion may be formed by a cellular body with closed cells or else by an air chamber defined by a sealed resilient material pipe containing a slightly compressed gas such as air.

Considering the deformability of cushion 11, it is advisable to complete an annular cage containing this cushion by means of a rigid L shaped washer 12.

Transverse flanges 13 may be provided at the axial ends of the external frame 2 for maintaining not only packing 7 but also washers 12 in position.

The sleeve which has just been described is essentially intended to receive and damp the alternate forces exerted between the two frames 1 and 2 in the diametrical direction D.

It may be advantageous to adapt it so as to receive, possibly with damping, forces exerted between these two frames in the axial direction of the sleeve or in a direction slightly slanted with respect thereto.

The above described construction of the elastomer body 3 by means of two thick truncated cone shaped walls $3_1$, $3_2$ is adavantageous to this end.

These two truncated cone shaped walls are juxtaposed by their small bases or, more precisely, the small bases are adhered respectively to two truncated cone shaped areas 14 which define a thick annular rib 15 projecting outwardly from the internal frame 1, each area 14 being substantially normal to the generatrices of the truncated cone shaped wall which is adhered thereto.

The presence of the thick rib 15 is made possible by the fact that the narrow channel is no longer provided about the central region of the internal frame 1.

By modifying the obliqueness of areas 14, the resistance of the sleeve to axial forces and resistance thereof to radial forces may be modified at will, the first being all the higher and the second all the lower the higher the slant of areas 14 with respect to the axial direction.

To increase resistance to axial forces, it may be advantageous to provide along the internal face of the external frame 2 a rigid cylindrical ring extending axially and jointingly between the two sausages or pads of body 3: such a ring has been shown with a dash dot line at 16.

Similarly, to increase the resistance of the sleeve not only to axial but also radial forces, an axial prestress is exerted on body 3, particularly during mounting of this body inside the external frame 2.

Because of the obliqueness of walls $3_1$ and $3_2$, this axial prestress is automatically accompanied by a certain raidal prestress.

The length of ring 16 is advantageously chosen so as to adjust to the desired value the amount of said prestress, the elastomer pads after mounting coming into abutment against the axial edges of this ring.

As mentioned above, the sausages in which the channels 5 or cushions 11 are housed are disposed radially about and opposite the endmost outer zones of the internal frame 1, being separated from these zones by grooves 19.

The small radial distance which separates these sausages from these zones may be cancelled out when high radial forces are exerted between the two annular frames 1 and 2; said sausages then come into abutment against said zones, which are advantageously coated with an elastomer layer 17 integral with body 3 - and thus a very efficient means is obtained for limiting the radial deformations of the sleeve.

To make the above described sleeve capable of damping, by a liquid throttling effect, certain relative oscillations exerted axially between the two frames 1 and 2, one at least of the two pockets 4 and 4' may be divided into two compartments communicating with each other through a narrow channel.

For this it is sufficient to fix to the rib 15 a rigid dividing wall in the form of a circular sector extending radially from said rib up to a small distance from the external frame 2: such a dividing wall has been shown with a dot dash line at 18 in FIGS. 1 and 2.

When an axial oscillation is exerted on frame 1 with respect to frame 2, or conversely, the liquid contained in one of the two compartments thus defined is driven alternately from this compartment into the other through the narrow channel defined radially between dividing wall 18 and the external frame 2 and the dimensions of this channel are chosen so that the maximum damping is then obtained for a given desired value of the frequency of said oscillations.

Figure 3:
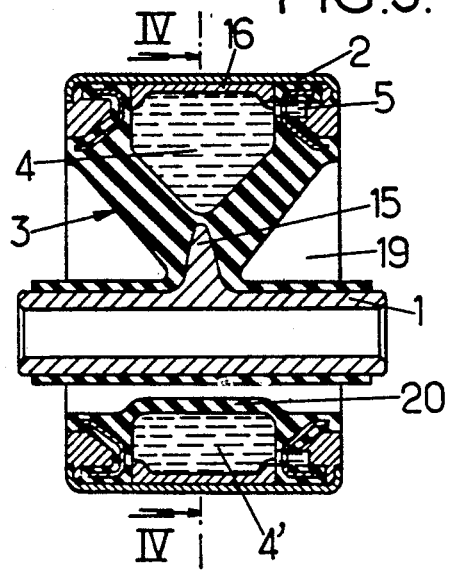
FIGS. 3 and 4 show a variant of such a sleeve also in accordance with the invention, respectively in axial section in the offload condition through III—III of FIG. 4 and in cross section under load through IV—IV of FIG. 3.
Figure 4:
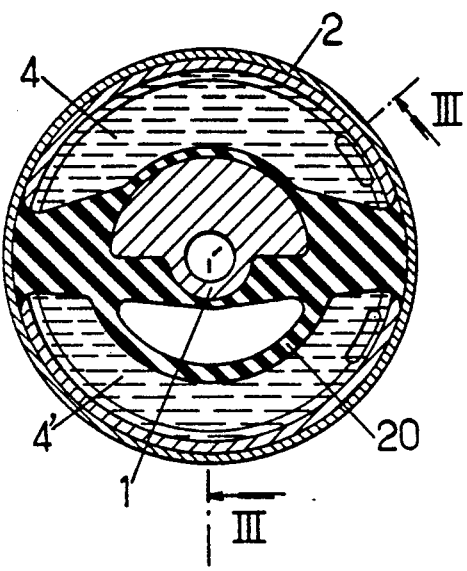

The embodiment shown schematically in FIGS. 3 and 4 differs essentially from the preceding one by the construction of pocket 4'.

Here, the portion of the elastomer body 3 which partially defines this pocket 4' is no longer formed by truncated cone shaped wall sections forming an X in axial section, but by a thin flexible membrane 20. This membrane is here in the form of a band curved in a semicircle and bulging slightly towards the axis. This band has two semicircular edges connected sealingly to the external frame 2 along the shrouds 6 and its two ends in the circumferential direction are connected to the arms $3_3$.

In this construction, rib 15 is not provided on the membrane 20 side.

Thus, only pocket 4 is defined by a portion of the elastomer body 3 having an axial section in the form of a radially outwardly open V and extending about the axis of the sleeve along only a half of the circumference.

This disymmetrical construction has the advantage of great radial flexibility.

Figure 5:
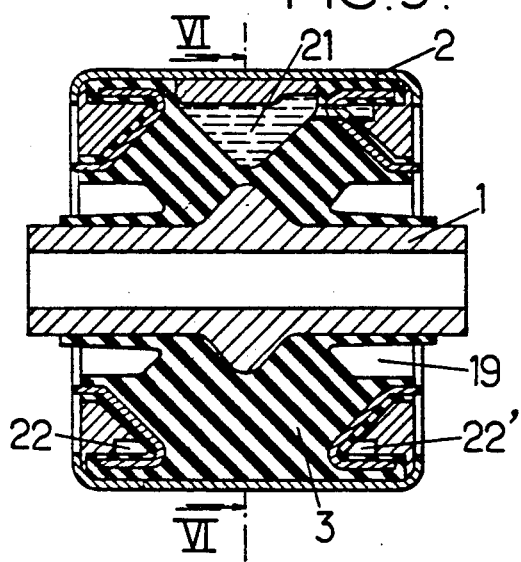
FIGS. 5 and 6 show yet another variant of such a sleeve in accordance with the invention, respectively in axial section through V—V of FIG. 6 and in simplified cross section through VI—VI of FIG. 5.
Figure 6:
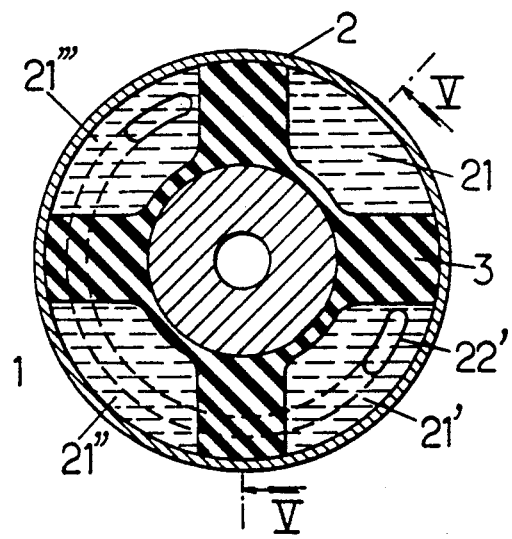

Finally, the embodiment shown schematically in FIGS. 5 and 6 differs from that illustrated in FIGS. 1 and 2, in that it has no longer only two sealed pockets 4 and 4', but four such pockets 21, 21', 21", 21'" disposed oppositely in pairs.

Each of these pockets is connnected to the diametrically opposite pocket by a narrow channel 22 or 22'.

Such a construction has the advantage of providing excellent damping of oscillations exerted on the support in two radial directions perpendicular to each other.

Following which, and whatever the embodiment adopted, a hydraulic anti-vibratory support sleeve is finally obtained whose construction, operation and advantages follow sufficiently from the foregoing.

As is evident, and as it follows moreover already from what has gone before, the invention is no no wise limited to those of its modes of application and embodiments which have been more especially considered; it embraces, on the contrary, all variants thereof.

What is claimed is:

1. In a support sleeve having two rigid tubular frames surrounding each other mutually and joined together by an elastomer body adhering thereto and shaped so as to form between said two frames at least two diametrically opposite sealed pockets communicating together through a narrow channel, the portion of the elastomer body which defines one at least of these pockets having in axial section the general form of a radially outwardly open V, and the assembly of pockets and the channel being filled with a damping liquid, said channel extends along a transverse arc of a circle having as axis the axis of the external tubular frame and is situated axially and radially at the level of the end of one of the arms of the above V.

2. The support sleeve as claimed in claim 1, wherein said channel is defined, on the one hand, by a metal shroud having a U shaped section opening outwardly of the sleeve in the direction of the axis of this sleeve and disposed inside the external tubular frame at the end thereof and, on the other hand, by an annular rigid packing introduced axially into this shroud.

3. The support sleeve as claimed in claim 2, wherein the bottom of the shroud communicates with one at least of the pockets through a circumferentially elongate aperture and the length of the channel may be adjusted by modifying the angular position of the annular packing in the shroud.

4. The support sleeve as claimed in claim 1, wherein communication is provided between the channel and the outside for filling the sleeve with liquid.

5. The support sleeve as claimed in claim 1, including two channels disposed respectively in the vicinity of the two axial ends of the sleeve, symmetrically with respect to its median transverse plane.

6. The support sleeve as claimed in claim 5, wherein one of the two channels is provided with a resiliently compressible cushion formed more particularly by a cellular material with closed cells and placed in communication with one at least of the two pockets.

7. The support sleeve as claimed in claim 1, wherein the outwardly diverging walls forming the elastomer body are adhered to two truncated cone shaped faces which define a central annular rib shaped as a V and forming part of the internal frame, each of these two truncated cone shaped faces being substantially normal to the generatrices of the truncated cone shaped wall adhering thereto.

8. The support sleeve as claimed in claim 1, wherein a dividing wall extending along the median transverse plane of the sleeve extends the internal frame radially outwardly up to a small distance from the external frame so as to divide the corresponding pockets into two compartments communicating together through the channel defined radially between this dividing wall and said external frame.

9. The support sleeve as claimed in claim 1, wherein a cylindrical rigid ring is provided along the inner face of the external frame, between two pads which define the elastomer body outwardly.

10. The support sleeve as claimed in claim 1, wherein the elastomer body is axially prestressed during mounting thereof inside the external frame.

11. The support sleeve as claimed in claim 1, wherein the number of sealed pockets is equal to four, disposed diametrically in pairs, and each of these pockets communicates with the diametrically opposite pocket through a channel.

12. The support sleeves as claimed in claim 1, wherein one of the pockets is defined by the external tubular frame and by a flexible membrane sealingly connected to this frame.

* * * * *